United States Patent [19]

Nakamura et al.

[11] Patent Number: 4,769,738

[45] Date of Patent: Sep. 6, 1988

[54] ELECTROSTATIC CAPACITIVE PRESSURE SENSOR

[75] Inventors: Kimihiro Nakamura; Toshiyuki Takano, both of Kanagawa, Japan

[73] Assignee: Fuji Electric Co., Ltd., Kanagawa, Japan

[21] Appl. No.: 127,262

[22] Filed: Dec. 1, 1987

[30] Foreign Application Priority Data

Dec. 12, 1986 [JP] Japan .................. 61-294787

[51] Int. Cl.$^4$ ................ H01G 5/16; G01L 9/12
[52] U.S. Cl. ..................... 361/283; 73/724
[58] Field of Search .............. 73/718, 724; 361/283

[56] References Cited

U.S. PATENT DOCUMENTS

| 4,257,274 | 3/1981 | Shimada et al. | 73/718 |
| 4,467,394 | 8/1984 | Grantham et al. | 361/283 |
| 4,495,820 | 1/1985 | Shimada et al. | 73/724 |
| 4,628,403 | 12/1986 | Kuisma | 361/283 |

FOREIGN PATENT DOCUMENTS 233863  11/1985  Japan .................. 361/283

*Primary Examiner*—Donald A. Griffin
*Attorney, Agent, or Firm*—Finnegan, Henderson, Farabow, Garrett and Dunner

[57] ABSTRACT

An electrostatic capacitive pressure sensor having two silicon diaphragms electrostatically bonded to opposite faces of an insulating member to form two measuring chambers. A silicon base is coupled to the first diaphragm to form a pressure chamber. The insulating member is provided with a through-hole electrode. The electrode and the two silicon diaphragms are operative to measure pressure in the pressure chamber by measuring changes in capacity in the measuring chambers.

4 Claims, 2 Drawing Sheets

PRESSURE P

ELECTROSTATIC CAPACITIVE PRESSURE SENSOR

BACKGROUND OF THE INVENTION

1. Field of the Invention

The present invention relates to an electrostatic capacitive pressure sensor and more particularly to an electrostatic capacitive pressure sensor employing silicon diaphragms.

2. Description of the Related Art

FIG. 1 is a sectional view of a conventional electrostatic capacitive pressure sensor.

As shown in FIG. 1, a thin diaphragm portion 1 is prepared by supersonic machining or by etching the central portion of one side of a silicon flat plate. A metal pad 3 (e.g., of Al, Au or Mo) is formed on the diaphragm 1 from which a lead wire 13 extends. A borosilicate glass base 2 whose coefficient of thermal expansion is close to that of silicon ($3.2 \times 10^{-6}/C.°$) is provided with a through-hole electrode 4 made of Cr-Au, Cr-Ni-Au or the like and is bonded to the thick portion of the silicon diaphragm 1 through a known electrostatic bonding method, so that a measuring chamber 15 is formed. A metal pipe 7 of Kovar (produced by Westinghouse Electric Corp.) or Fe-Ni may be bonded onto the borosilicate glass base 2 with a junction layer 6 whose coefficient of thermal expansion is as low as $5 \times 10^{-6}/C.°$ to form a port for introducing pressure P.

The above-described conventional sensor has many disadvantages and drawbacks. Although the reproducibility of the measuring gap between the silicon diaphragm 1 and the electrode 4 is superior according to the electrostatic bonding method, there is a loss of airtightness because of foam left in the junction (the portions that have not been coupled).

There is an alternate method to the electrostatic coupling method of bonding the silicon diaphragm 1 and the glass base 2. In this alternate method, glass is applied to the electrostatic junction 8 of FIG. 1, the glass having a low coefficient of thermal expansion. However, the gap between the diaphragm and the electrode is difficult to reproduce with high dimensional accuracy, although airtightness is excellent. Particularly when the pressure sensor is intended for miniaturization, the gap should be as small as 10 $\mu$m or less and it is almost impossible to provide a gap as small as 10 $\mu$m or less with the preferred reproducibility. Although a thin film of Cr-Ni-Au may be deposited and formed on the borosilicate glass 2 through evaporation by making use of the Au-Si eutectic reaction, the measuring gap is also difficult to accurately reproduce.

Because a pair of opposite electrodes are used for measurement, the dielectric constant of the pressure medium within the measuring chamber is affected by temperature. Consequently, the resulting temperature characteristics of the sensor are bad, which makes it impossible to obtain a signal properly proportional to the pressure.

An object of the present invention is to provide a highly accurate electrostatic capacitive pressure sensor in terms of temperature characteristics, and more particularly to provide an electrostatic capacitive pressure sensor having a gap between a silicon diaphragm and an electrode which can be reproduced with high accuracy and efficiency. A further object of the present invention is to airtightly bond the pressure introducing chamber.

SUMMARY OF THE INVENTION

To achieve the objects and in accordance with the purpose of the invention as described herein, there is provided an electrostatic capacitive pressure sensor having a silicon base member with a pressure introducing part and two silicon diaphragms. The diaphragms have a central portion and an outer peripheral portion, the central potion having a thickness less than the thickness of the outer peripheral portion. The first diaphragm is coupled at the outer peripheral portion to the base to form a pressure chamber in communication with the pressure port. An insulating member having an electrode disposed thereon and having a first and second face is provided with the first face of the insulating member coupled to the first diaphragm at one side of the peripheral portion thereof to form a first measuring chamber between the first diaphragm and the first face of the insulating member. The second diaphragm is coupled at one side of its outer peripheral portion to the second face of the insulating member to form a second measuring chamber between the second diaphragm and the second face of the insulating member. Conducting means are connected to the first and second diaphragms and the electrode to detect the capacitance in the first and second measuring chambers for measuring the pressure applied through the pressure introducing port. As presently embodied, the conducting means include a metal pad 3A and lead wire 13A extending from the first diaphragm, a metal pad 3B and lead wire 13B extending from the second diaphragm, and a through-hole electrode 4.

The silicon base is coupled to the thick portion of the first silicon diaphragm with a junction layer therebetween to airtightly couple the pressure introducing chamber and increase the mechanical strength of the sensor. By electrostatically coupling the insulating substrate having the through-hole electrode in the face opposite to that of the silicon base to the first diaphragm, a first measuring chamber having a gap offering excellent reproducibility is formed. Moreover, there is formed a second measuring chamber having a gap offering superior reproducibility as well by electrostatically coupling the second silicon diaphragm to the second face of the insulating substrate.

BRIEF DESCRIPTION OF THE DRAWINGS

The accompanying drawings, which are incorporated in and constitute a part of this specification, illustrate preferred embodiments of the invention, and together with the description, serve to explain the principles of the invention.

DESCRIPTION OF THE PREFERRED EMBODIMENTS

Figure 1:
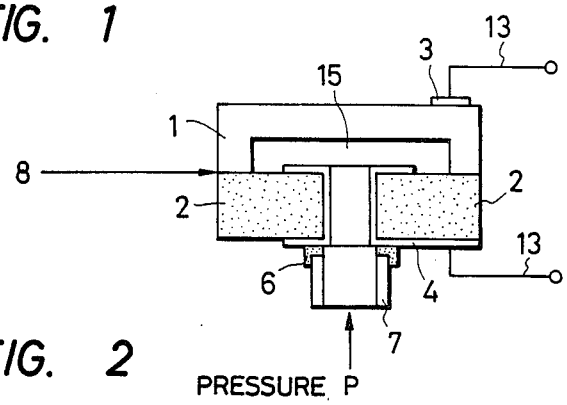
FIG. 1 is a sectional view of a conventional sensor.
Figure 2:
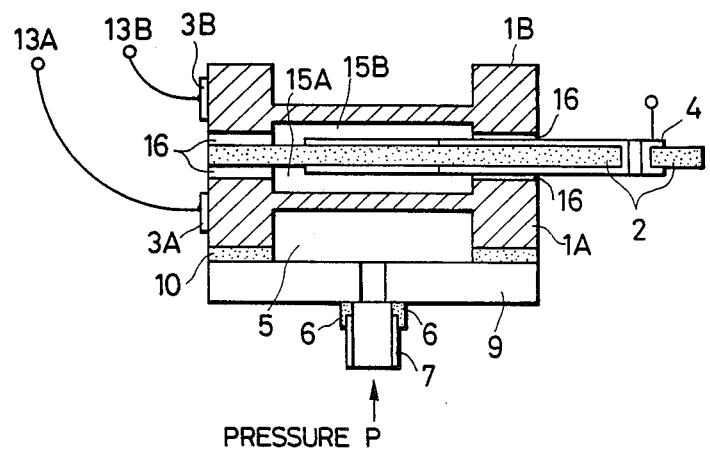
FIG. 2 is a sectional view of a first embodiment of the present invention.
Figure 3:
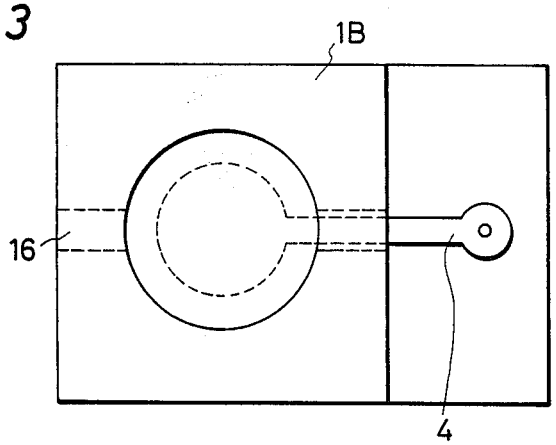
FIG. 3 is a top view of the sensor depicted in FIG. 2.

FIG. 2 shows a cross sectional view of a first embodiment of the present invention. FIG. 3 shows a top view of the embodiment depicted in FIG. 2.

A first embodiment of a pressure sensor of the present invention is characterized in that two measuring chambers 15A, 15B, respectively, are formed with measuring gaps offering excellent reproducibility by electrostatically coupling together two silicon diaphragms 1A, 1B having substantially the same shape on both sides of an insulating substrate 2 (e.g. a borosilicate glass substrates with a coefficient of thermal expansion at $3.2 \times 10^{-6}/C.°$). The substrate 2 has a through-hole electrode 4. A pressure chamber 5 is airtightly formed by bonding a silicon base 9 to the thick portion of the silicon diaphragm 1A with a junction layer 10 made of glass with a coefficient of thermal expansion of $3.4 \times 10^{-6}/C.°$, which is close to that of silicon. This structure increases the mechanical strength of a sensor. An opening 16 is also provided for introducing a pressure medium into the measuring chambers 15A, 15B to minimize the effect of temperature on the dielectric constant and to improve the temperature characteristics of the sensor.

Figure 4:
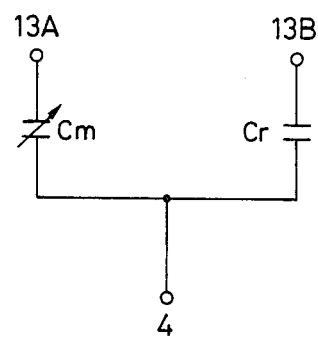
FIG. 4 is a circuit diagram showing the circuit of a sensor according to the present invention.

When a fluid under pressure is introduced via a metal pipe 7, the thin portion of the silicon diaphragm 1A is displaced by a distance which depends on the pressure P applied. Because the gap (the measuring chamber 15A) formed between the silicon diaphragm 1A and the insulating substrate 2 changes, the capacitance therebetween changes. The measured capacitance between the electrode and the first diaphragm (Cm) can be taken out as an electrostatic capacitance through metal pad 3A and lead wire 13A and the through-hole electrode 4. On the other hand, because the measuring chamber 15B is not involved in the pressure fluctuation, the electrostatic capacitance taken out via metal pad 3B and lead wire 13B and the electrode 4 remains unchanged. The capacitance between the second diaphragm and the electrode is the reference capacitance (Cr). FIG. 4 shows a circuit for the sensor thus arranged. More specifically, the capacitance taken out via the lead wire 13A and the electrode 4 (Cm) is used for measuring purposes, whereas the capacitance (Cr) taken out via the lead wire 13B and the electrode 4 is employed for reference. With the use of these capacitances, the pressure P is, as has been known very well, expressed by the equation:

$$(Cm - Cr)/Cm \propto P.$$

Since the dielectric constant is a function of temperature, it becomes possible to obtain a highly accurate pressure signal free from the effect of temperatures.

Figure 5:
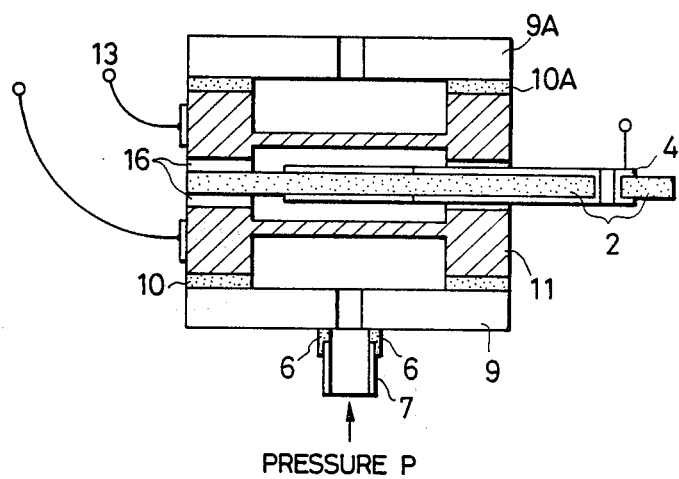
FIG. 5 is a sectional view of a second embodiment of the present invention.

FIG. 5 is a sectional view of a second embodiment of the present invention. As is obvious from FIG. 5, a second silicon base 9A is added with a junction layer 10A between the second silicon base 9A and the silicon diaphragm 1B. This design is intended to improve symmetry on the insulating substrate 2, decrease the deformation of the sensor due to the difference in the coefficient of thermal expansion and further improve the temperature characteristics. All other parts shown in FIG. 5 correspond to parts referenced in FIG. 2.

According to the present invention, the electrostatic capacitive pressure sensor has a first silicon diaphragm 1A and a second silicon diaphragm 1B, each of the silicon diaphragms being prepared by processing the central area of both sides of a silicon plate so as to make its central portion thin and to make its outer peripheral portion thick. An insulating substrate 2 with a through-hole electrode 4, is characterized in that the insulating substrate 2 is electrostatically bonded to one of the faces of the thick portion of the first diaphragm to form a first measuring chamber 15A, whereas the silicon base is airtightly bonded to the other face thereof with a junction layer therebetween, and the thick portion of the second silicon diaphragm is electrostatically bonded to the face of the insulating member opposite to that where the first measuring chamber of the insulating substrate is formed so as to form a second measuring chamber 15B. Accordingly, it becomes possible to form the measuring and reference capacities at an excellent balance and readily obtain a signal proportional to the pressure resulting from the combination of external circuits. In addition, an electrostatic capacitive pressure sensor offering excellent temperature characteristics is provided.

Having described preferred embodiments of the present invention, it is recognized that variations and modifications thereof will become apparent to one skilled in the art without departing from the spirit of the invention, the scope of which is intended to be defined by the appended claims and the equivalents thereof.

What is claimed is:

1. An electrostatic capacitive pressure sensor, comprising:
    a silicon base member having a pressure introducing port;
    a first silicon diaphragm having a central portion and an outer peripheral portion, the central portion having a thickness less than the thickness of the outer peripheral portion, said first diaphragm being coupled at said outer peripheral portion to said base member to form a chamber in communication with said pressure port;
    an insulating member having an electrode disposed thereon, said insulating member having a first and second face, said first face of said insulating member coupled to said first diaphragm at one side of the peripheral portion to form a first measuring chamber therebetween;
    a second silicon diaphragm substantially identical to said first diaphragm, said second diaphragm coupled at one side of said outer peripheral portion to said second face of said insulating member to form a second measuring chamber therebetween; and
    conducting means connected to said first and second diaphragms and said electrode for detecting the capacitance in said first and second measuring chambers for measuring pressure applied through said pressure introducing port.

2. An electrostatic capacitive pressure sensor as recited in claim 1, wherein the first and second diaphragms are electrostatically bonded to the first and second faces, respectively, of said insulating member.

3. An electrostatic capacitive pressure sensor as recited in claim 1, wherein the surface area of the electrode disposed within the first measuring chamber is equal to the surface area of the electrode disposed within the second measuring chamber.

4. An electrostatic capacitive pressure sensor as recited in claim 1, further comprising a second silicon base member coupled to the second diaphragm at the outer peripheral portion thereof.

* * * * *